(12) United States Patent
Naeimi et al.

(10) Patent No.: US 9,223,544 B2
(45) Date of Patent: Dec. 29, 2015

(54) NUMBER REPRESENTATION AND MEMORY SYSTEM FOR ARITHMETIC

(75) Inventors: Helia Naeimi, Santa Clara, CA (US);
Ralph Nathan, Santa Clara, CA (US);
Shih-Lien L. Lu, Portland, OR (US);
John L. Gustafson, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 13/606,998

(22) Filed: Sep. 7, 2012

(65) Prior Publication Data

US 2014/0074902 A1    Mar. 13, 2014

(51) Int. Cl.
*G06F 7/483* (2006.01)
*G06F 7/38* (2006.01)
*G06F 7/499* (2006.01)

(52) U.S. Cl.
CPC *G06F 7/483* (2013.01); *G06F 7/38* (2013.01); *G06F 7/49989* (2013.01)

(58) Field of Classification Search
None
See application file for complete search history.

(56) References Cited

U.S. PATENT DOCUMENTS

| 6,049,865 | A | * | 4/2000 | Smith | 712/222 |
| 6,247,036 | B1 | * | 6/2001 | Landers et al. | 708/603 |
| 2002/0194232 | A1 | * | 12/2002 | Walster | 708/207 |
| 2003/0033335 | A1 | * | 2/2003 | Walster | 708/207 |
| 2004/0117421 | A1 | * | 6/2004 | Steele, Jr. | 708/495 |
| 2007/0260665 | A1 | * | 11/2007 | Wang | 708/498 |
| 2014/0074902 | A1 | * | 3/2014 | Naeimi et al. | 708/495 |

* cited by examiner

*Primary Examiner* — David H Malzahn
(74) *Attorney, Agent, or Firm* — Kenyon & Kenyon LLP

(57) ABSTRACT

A method, device and system for representing numbers in a computer including storing a floating-point number M in a computer memory; representing the floating-point number M as an interval with lower and upper bounds A and B when it is accessed by using at least two floating-point numbers in the memory; and then representing M as an interval with lower and upper bounds A and B when it is used in a calculation by using at least three floating-point numbers in the memory. Calculations are performed using the interval and when the data is written back to the memory it may be stored as an interval if the size of the interval is significant, i.e. larger than a first threshold value. A warning regarding the suspect accuracy of any data stored as an interval may be issued if the interval is too large, i.e. larger than a second threshold value.

36 Claims, 3 Drawing Sheets

NUMBER REPRESENTATION AND MEMORY SYSTEM FOR ARITHMETIC

BACKGROUND INFORMATION

Floating-point arithmetic has become indispensible to modem computing. It is used in fields as diverse as gaming, financial analysis, high performance scientific computing, and numerous others. However, despite this widespread usage, few developers take into account the approximate nature of such computations.

The current standard in floating-point arithmetic is the IEEE-754-2008 standard (see "IEEE Standard for Floating-point Arithmetic", IEEE 754-2008, pp. 1-58, August 2008). It uses a finite number of bits to describe an infinite space by dividing the bits into three parts: the sign bit, the exponent and the mantissa. The number of bits in the exponent controls the interval that may be represented and the number of bits in the mantissa controls the precision. The IEEE-754 standard contains guarantees on the precision of the result of a computation and on the error of a single operation requiring that the result of an elementary arithmetic operation (addition, subtraction, multiplication, division, and square root) be within 0.5 Units of Least Precision (ULP) of the mathematically exact result. However, one of its shortcomings is the lack of accuracy guarantees on the result of a sequence of operations.

The IEEE-754 floating-point standard defines several levels of precision for binary floating-point numbers: a single precision floating-point number has an 8 bit exponent, a 24 (23+1) bit mantissa and a sign bit; a double precision floating-point number has an 11-bit exponent, a 53 (52+1) bit mantissa, and a sign bit; and a quad precision floating-point number has a 15-bit exponent, a 113 (112+1) bit mantissa and a sign bit. The precision of a floating-point has a direct impact on its accuracy.

There is a rounding error associated with each floating-point operation, however, the error of a single operation is easily quantified. The error associated with any operation is the potential rounding that occurs after the operation has been executed. This rounding, which could be due to any rounding mode, always affects the least significant bit of the mantissa, and it is at most 1 Unit of Least Precision (ULP). This level of error is acceptable in most applications for a single floating-point operation since the error is limited to the least significant bit.

However, a greater problem arises from error propagation, when the error that was limited to the least significant bit of the mantissa gets promoted to a more significant bit resulting in a greater error. This can happen in two different scenarios: gradual error and catastrophic error. The gradual error, or "creeping crud", is caused by a series of operations that gradually promote the bit containing the initial rounding error to a more significant place. On the other hand, catastrophic error, or left digit destruction, occurs when the bit that contains the rounding error is propagated to a much more significant position in the mantissa in a single operation. A simple example of when this can happen is the subtraction of two numbers that should be the same, but which due to rounding errors are a single bit off in the least significant bit of the mantissa. The problem begins when the remaining bit gets moved to a more significant position in the mantissa after the subtraction. This problem can be exacerbated if the numbers being subtracted are large, because in that case the erroneous mantissa would be raised to a large exponent as illustrated in the example below.

EXAMPLE 1

Decimal Example of Catastrophic Error or Left Digit Destruction $A=1.123676*10^{50}$
$B=1.123678*10^{50}$
$A-B=0.000002*10^{50}=-2*10^{44}!=0$ Current solutions are very ad-hoc. Most programmers start by running their code with IEEE-754 single (or double) precision floating-point. If the result is different from what was expected, they run the program with higher precision floating-point hoping that it would generate the correct result. This ad-hoc method represents a non-scientific approach to determine the amount of precision required to solve a problem. There are two main problems with this solution: the detection process is very application based and heavily depends on the programmer's intuition and there is a limit to how far precision can be increased. This limit is currently 128-bit for quad precision floating-point.

In mathematics an interval is a set of numbers (e.g. reals, integers, etc.) consisting of all the numbers between a pair of given numbers along with either, both, or none of the end-points or bounds. Interval arithmetic involves representing numbers as intervals instead of discrete values such that the interval is guaranteed to contain the actual value.

There are two common ways to represent intervals. The infimum-supremum (IS) represents an interval using two floating-point numbers; one for the lower bound of the interval (infimum) and one for the upper bound (supremum). Computations performed on the interval are performed on these bounds. An interval X, with lower bound A and upper bound B is denoted by X=[A B].

Another interval arithmetic representation is the midpoint-radius (MR) representation. The midpoint-radius representation consists of two floating-points used to represent an interval: a midpoint and a radius. With this representation, the lower bound is the midpoint minus the radius and the upper bound is the radius plus the midpoint. An interval, X, with a midpoint, M, and a radius, R, is: X=(M, R).

The downside of interval arithmetic, and of these representations by association, is the fact that the width of the interval can grow after each calculation and a wider interval contains less information about the answer. Each of these two common representations, which represent an interval in different ways, has its own advantages and disadvantages with respect to preventing the interval's width from growing. For example, with the IS representation implementation is easy and the interval grows less than it would for the MR method in some cases. The MR representation, on the other hand, allows the representation of floating-point numbers that would not be representable using the IS representation. However, the width of the interval can grow even faster than the width of the IS representation as the radius gets greater.

DETAILED DESCRIPTION OF EXAMPLE EMBODIMENTS

Figure 1A:
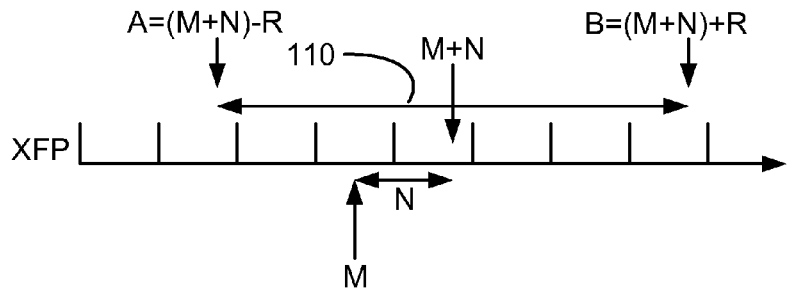
FIG. 1A illustrates an interval used to represent a floating-point number using the (midpoint, N, radius) or (M+N, R) representation.

Embodiments of the present invention include methods and systems for representing numbers in a memory of a computer system, including representing a floating-point number as an interval when it is accessed by using at least two floating-point numbers in the memory; and then representing it as an interval by using at least three floating-point numbers in the memory when the number is used in a calculation. After the calculations are performed when the data is written back to the memory it may be stored as an interval only if the size of the interval is larger than a first threshold value. In this way computation errors or even hardware errors in the system may be detected and a warning regarding the accuracy of the data stored as an interval may be issued to the calling application or the computer system operating system if the size of the interval is larger than a second threshold value. Furthermore the use of only as many floating-point numbers as necessary at any stage of the calculations allows for reduced system power consumption and the use of only as many floating-point numbers as necessary also allows for reduced usage of memory and bandwidth in the system.

Embodiments of the present invention will now be described in detail, by way of example only, with reference to the accompanying drawings in which identical or corresponding parts/features are provided with the same reference numerals in the figures.

The (midpoint, N, radius) or (M+N, R) representation, shown in FIG. 1A, ensures a tighter bound than the standard interval arithmetic representations mentioned above. The (M+N, R) representation may consist of three IEEE-754 compliant floating-point numbers that are used to represent an interval 110 of floating-point numbers with lower and upper bounds A and B along an axis XFP. The main source of the interval growth in the MR representation is the error in the midpoint which may cause the size of the interval to grow twice as much as the error itself. Therefore, this problem may be addressed by improving the accuracy of the midpoint representation. In order to do this, the midpoint of the interval 110 may be represented using two floating-point numbers, M and N, and the radius represented using R, as in the standard MR representation. The error from M is compensated for by N and the error from N, and therefore from M, is represented by the radius R. The actual midpoint is the number we are trying to represent using floating-point but cannot due to the lack of precision inherent in the IEEE-754 floating-point standard. The actual midpoint is represented as a sum of M and N, where M is used to represent the upper digits of the midpoint and N is used to represent the lower digits. The radius R represents the error, or the uncertainty in the midpoint M+N. Thus, the interval 110 is represented using 3 floating-points where M+N is the midpoint of the interval and R is the radius so that A=(M+N)−R and B=(M+N)+R.

The basic operations like addition, subtraction and multiplication may be implemented in hardware. Implementing (M+N, R) representation in hardware allows for errors of less than 1 ULP because more information is available. For example; during an addition operation, the error is the bits shifted out when the mantissas are being aligned, and these bits are available to use in the hardware. The software does not have access to these bits. In the multiplication operation, the error is the lower half of the mantissa product which is used instead of being discarded. For example, the conversion operation to convert an IEEE-754 floating-point number x, to an interval X, where X=[M+N, R] and M and x are of not of the same precision, may be implemented as:

M=☐x
N=(x−M)
R=error(N)

wherein ☐ denotes the rounding mode: "round to the nearest". This operation is not necessary if M and x are of the same precision.

After each operation, it is possible for the absolute value of N to be greater than the distance to the next floating-point from M, i.e. the absolute value of N creeps up. To maximize the precision, it is necessary to shift N towards M. Thus, the adjustment operation reduces N and shifts M in the direction that N was reduced, thereby not changing M+N. The advantage of this adjustment is that it enables narrower intervals because the error of N is now smaller. For example, the adjustment operation to adjust a floating-point number M+N may be implemented as follows with 1ULP=1 floating point=1FP:

if(N>1ULP)then M=M+1ULP and N=N−1ULP; and
if(N<1ULP)then M=M−1ULP and N=N+1ULP.

The main benefit of the (M+N, R) representation over the MR and IS representations is generating tighter intervals. This is due to the presence of N, that allows for the representation of points not representable by a single floating-point number. Comparing the midpoint of the MR representation to the midpoint of the (M+N, R) representation involves the comparison of a single floating-point to a sum of two floating-points. With the same number of bits, the sum of two floating-point numbers generates a higher precision number than a single floating-point number would. For example, the sum of two 32-bit floating-point number generates higher precision number than a single 32-bit number. The distance between two consecutive 32-bit floating-point numbers M and M' is $2^{eM} \times 2^{-23}$ where eM is the value of the exponent of M. Now if $M = M_{32} + N_{32}$, and $N_{32} = 0$, then the next consecutive number represented by the sum of two floating-point number, $M_{32} + N_{32}$, is essentially the smallest positive 32-bit number (stored in $N_{32}$) scaled by a certain factor. Since $N_{32}$ contains the error bits in $M_{32}$, the value of $N_{32}$ is scaled by 1 ULP or 1FP (in this case the largest 32-bit number) value and then added to $M_{32}$. In other words, $N_{32}$ extends the mantissa of $M_{32}$. Therefore the next consecutive number represented by $M_{32} + N_{32}$ is the smallest 32-bit number scaled by 1ULP, i.e. $2^{-126} \times 2^{-23} \times 2^{eM} = 2^{-149} \times 2^{eM}$. So, we clearly see that the sum of two floating-point numbers has higher precision than a single floating-point. This result is easily extendable to other floating-point precisions, e.g. 64, 128, etc.

In a comparison between the (M+N, R) representation and the known IS and MR representations the simulation methodology included the use of the C++ MPFR library (see L. Fousse, G. Hanrot, V. Lefevre, P. Pelissier and P. Zimmerman, "MPFR", *ACM Transactions on Mathematical Software*, vol. 33, pg. 13-es, June 2007) to implement the C++ types float, double, and long double. The use of MPFR allowed us to model the hardware implementation of the (M+N, R) representation. For each entry in Table 1 below, the results are calculated with a single floating-point to illustrate the base case, with IS, MR representations, and (M+N, R) representations. In the columns titled Double Precision, each floating-point number uses 64-bits, both of the IS floating-points use 64-bits (128-bits overall), as do both of the floating-points of the MR representation. The 3 floating-points in the (M+N, R) representation each use 64-bits (192-bits overall). Similarly, in the column titled Quad Precision, each floating-point number uses quad precision (128-bits).

The example of Table 1 involves Rump's Polynomial (i.e. $F(x,y)=333.75y^6+x^2(11x^2y^6-y^6-121y^4-2)+5.5y^8+x/2y$) which heavily stresses floating-point and produces vastly different answers when different precisions are used for the calculation. The above-mentioned traditional interval arithmetic methods are unable to produce a tight enough interval for this problem because they overestimate the error.

TABLE 1

|  | Double Precision | Quad Precision |
|---|---|---|
| One Floating-point | $1.1806 * 10^{21}$ | 1.1726 |
| IS | $[-5.9029 * 10^{21},$ $2.3612 * 10^{21}]$ | $[-1022.8,$ $1.1726]$ |
| MR | $(1.1806 * 10^{21},$ $4.3070 * 10^{22})$ | $(1.1726,$ $3.7357 * 10^5)$ |
| (M + N, R) | $(1.1726,$ $-6.3066 * 10^{-17},$ $1.3107 * 10^5)$ | $(-0.82740,$ $-8.9895 * 10^{-35},$ $1.2132 * 10^{-68})$ |
| Correct Answer | $-0.82740\ldots$ | |

As can be seen in the data of Table 2, the (M+N, R) representation provides the tightest interval width among all the interval representations for both double precision and quad precision. In addition, the (M+N, R) representation produces a better result than using just a single floating-point. For double precision, the single floating-point yields an incorrect answer of $1.1806*10^{21}$ while the (M+N, R) representation's answer (i.e. M+N from the (M+N, R) representation or $1.1726-6.3066*10^{-17}$) though still incorrect at 1.1726, is a better estimate. Furthermore, the large radius (i.e. $1.3107*10^5$) produced by the (M+N, R) representation may alert the computer system to the fact that the answer may be incorrect.

In order to get the correct answer using a single floating-point, it was necessary to use 256-bits of precision and even though single floating-point can generate a correct result (albeit with 256 bits), the system user still does not have any indication regarding the accuracy of the result and therefore has less confidence in the result. Furthermore, 256-bit floating-point is not IEEE compliant, which is another limitation of using higher and higher precision floating-point after the maximum IEEE compliant floating-point precision at 128-bits has been reached. These limitations do not exist for the (M+N, R) representation, in fact, the result generated using the (M+N, R) representation with three quad precision floating-point numbers (384-bits) is the correct result and, in addition, it gives the user a high level (close to 100% in light of the very small interval radius of $1.2132*10^{-68}$) of confidence that it is indeed the correct answer.

Figure 1B:
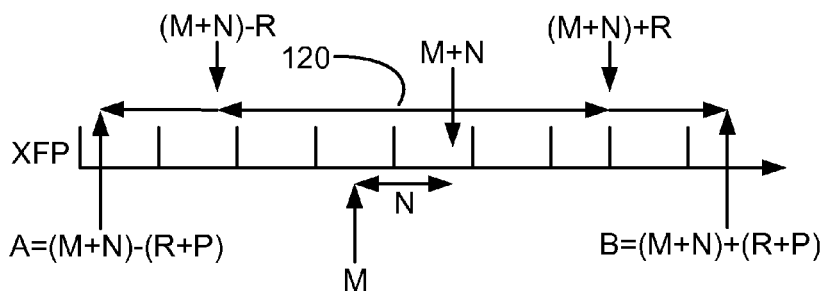
FIG. 1B illustrates an interval used to represent a floating-point number using the (midpoint, N, radius, P) or (M+N, R+P) representation.

The (midpoint, N, radius, P) or (M+N, R+P) representation, shown in FIG. 1B, ensures a tighter bound than the standard interval arithmetic representations mentioned above and of the (M+N, R) representation. The (M+N, R+P) representation may consist of four IEEE-754 compliant floating-point numbers that are used to represent an interval 120 of floating-point numbers with lower and upper bounds A and B along an axis XFP. This method is an improvement on the (M+N, R) representation described above by including a second floating-point number for the representation of the radius as well as the midpoint. The error in the radius may be addressed by having the error from R compensated for by P and the actual radius is represented as a sum of R and P, where R is used to represent the upper digits of the midpoint and P is used to represent the lower digits. Thus, the interval 120 is represented using 4 floating-points where M+N is the midpoint of the interval and R+P is the radius so that A=(M+N)−(R+P) and B=(M+N)+(R+P).

Figure 1C:
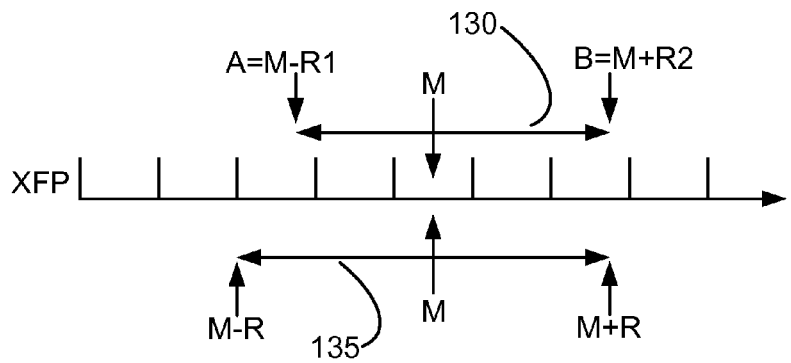
FIG. 1C illustrates an interval used to represent a floating-point number using the (midpoint, radius1, radius2) or (M, R1, R2) representation.

The (midpoint, radius1, radius2) or (M, R1, R2) representation, shown in FIG. 1C, ensures a tighter bound than the standard MR arithmetic representation mentioned above. The (M, R1, R2) representation may consist of three IEEE-754 compliant floating-point numbers that are used to represent an interval 130 of floating-point numbers with lower and upper bounds A and B along an axis XFP. This method is an improvement on the standard MR representation because it addresses the problem of asymmetric bounds. In order to do this, the midpoint of the interval 110 may be represented using a floating-point number M as in the standard MR representation, and the radius represented using two floating-point numbers R1 and R2. This representation generates a tighter interval 130 than the standard MR representation interval 135 because it is more accurately representing the lower bound A as M−R1 instead of M−R. Thus, the interval 130 is represented using 3 floating-points where M is the midpoint of the interval and R1 and R2 are the radii so that A=M−R1 and B=M+R2.

Figure 2:
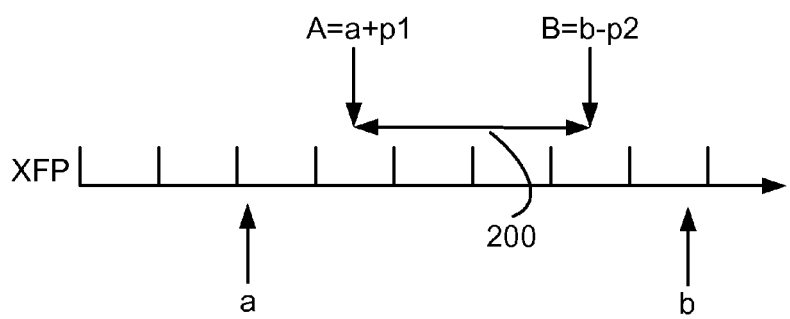
FIG. 2 illustrates an interval used to represent a floating-point number using the double infimum-supremum or [a+p1, b-p2] representation.

The double infimum-supremum or [a+p1, b−p2] representation, shown in FIG. 2, ensures a tighter bound than the standard infimum-supremum representation mentioned above. The [a+p1, b−p2] representation may consist of four IEEE-754 compliant floating-point numbers that are used to represent an interval 200 of floating-point numbers with lower and upper bounds A and B along an axis XFP. This representation is an improvement over the standard infimum-supremum representation because, as mentioned above, with the same number of bits, the sum of two floating-point numbers generates a higher precision number than a single floating-point number would. Thus, the interval 200 is represented using 4 floating-point numbers where A=a+p1 and B=b−p2.

Figure 3:
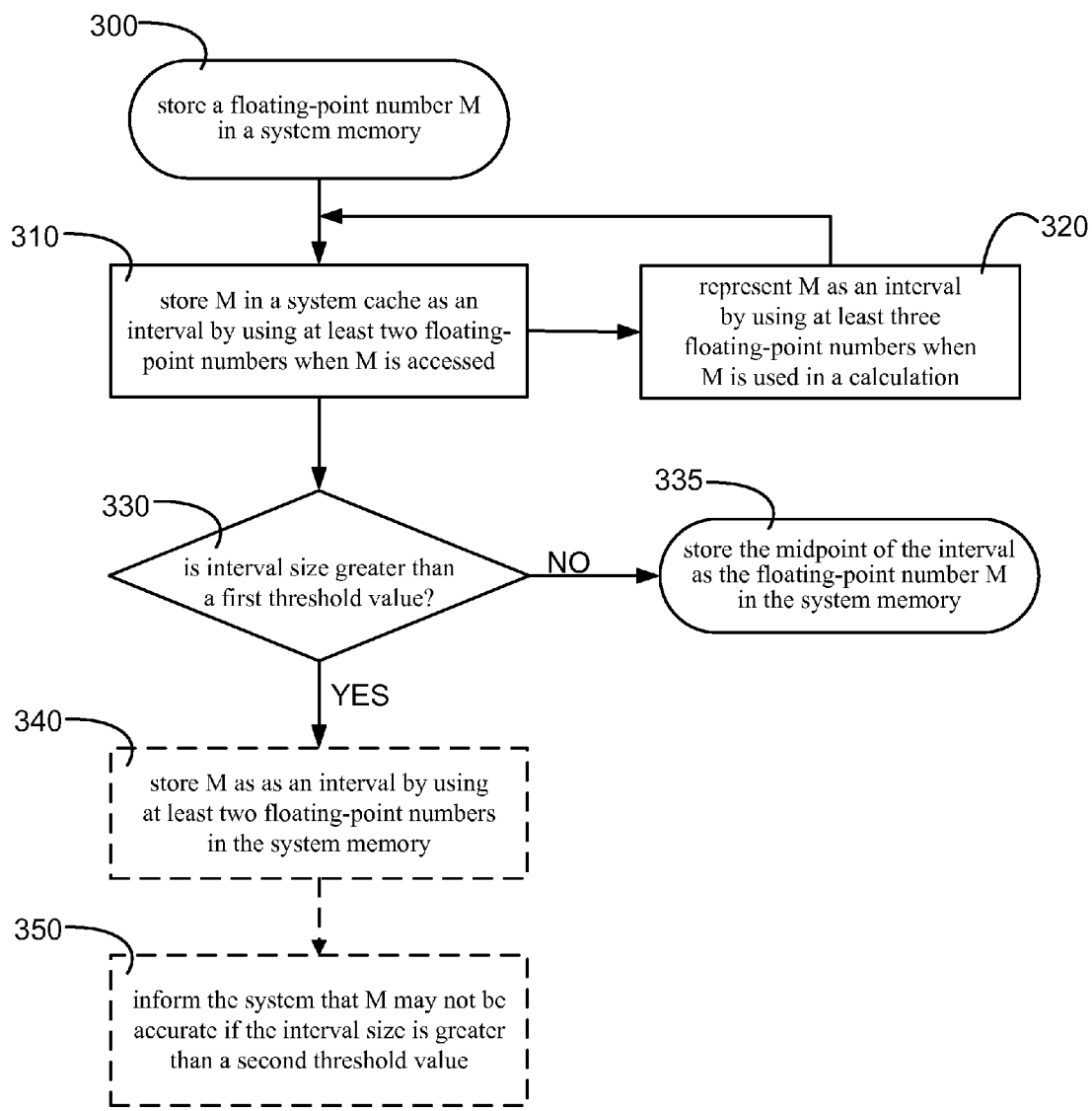
FIG. 3 is a flow chart of a method for representing numbers in a memory of a computer system according to an example embodiment of the present invention.

FIG. 3 is a flow chart of a method for representing numbers in a memory of a computer system according to an example embodiment of the present invention. In a first operation 300, a floating-point number M is stored in the main memory. For example, the (M+N, R) representation may be implemented in a hierarchical manner, similar to how the memory of a computer system is organized. In the memory, at the start of a program, the compiler stores floating-point data (like M) using only a single, IEEE standard floating-point (e.g. in main memory) and not using an interval. In a second operation 310 the floating-point number M is represented as an interval with lower and upper bounds A and B by using at least two floating-point numbers in the memory when M is accessed. For example, when M is accessed it moves in the memory hierarchy to the cache or register file, it may be stored in the IS or MR format with two IEEE-754 floating-points used to represent it. If the floating-point number (M) written to a cache or register file from the main memory is an exact floating-point number, then the value for R will be zero, otherwise, there will be error in the midpoint due to the initial conversion from a real number to a floating-point number. In a third operation 320 the floating-point number M is represented as an interval with lower and upper bounds A and B by using at least three floating-point numbers in the memory when M is used in a calculation. For example, it may be stored in the (M+N, R) format with three IEEE-754 floating-points used to represent it. If the floating-point number (M) written to a processing core (with a floating-point unit (FPU)) from the register file is an exact floating-point number, then the values for N and R will be zero. Calculations may be done in the core on intervals and when the data is written back to the cache (return to step 310 as shown in FIG. 3), only the midpoint and the radius may be written back using two floating point numbers. The midpoint error is represented in the radius, thereby slightly increasing the width of the interval.

In a fourth operation 330 it is determined if the size of the interval is greater than a first threshold value and if the size of the interval stored in the cache is not greater than the first threshold value then the radius is dropped and just the midpoint is written back to the main memory as the floating point number M in a fifth operation 335. If it is determined that the size of the interval is greater than a first threshold value (e.g. N+R is greater than a first predefined threshold value) the floating-point number M may be returned to the memory as an interval with lower and upper bounds A and B by using the floating-point number R in which M is the midpoint of the interval and R is the radius so that A=M−R and B=M+R in a sixth operation 340. Therefore, when data is to be written back to the main memory it may be done in several ways. If the width of the interval is "too small," then the radius is dropped and just the midpoint is written back, but if the value of the radius is "significant," then both the midpoint and the radius are written back to main memory. In a sixth operation 350 if the size of the interval after M is used in a calculation is larger than a second predefined threshold value (e.g. N+R is greater than a second predefined threshold value) the computer system may be informed that the floating-point number M may not be accurate. For example, if the radius is "too large," the midpoint and the radius are both written back to memory and in addition an exception may be raised that informs the system that the result, or an intermediate value, has high uncertainty and may not be accurate. The exception does not categorically state that the result is inaccurate since the interval may have just grown organically as a result of the instructions executed and the midpoint may very well be accurate. This exception also does not necessarily give cause for the high uncertainty because it could be either a numerical instability in the program or transient physical error, such as a high energy particle strike. This should be rather straight-forward to determine: if the same exception is raised when the program is re-run, then the odds are that the exception is caused due to some numerical instability in the program and not as the result of a transient physical error. The user can try increasing the precision used in the program and re-running to hopefully obtain the correct answer.

Thresholds for the intervals, e.g. widths that are judged to be "too small" or "too large," may be initialized to values that are non-problem specific. Initially, "too small" may mean that the width of the interval includes floating-points only up to some small arbitrarily defined number of floating-points away from the midpoint, while an interval whose width is "significant" may be understood to include floating-points with the same exponent as the midpoint, but with a different mantissa. An interval's width may be said to be "too large" if the width exceeds $2^{\text{\# of bits in the mantissa}}$ floating-points away from the midpoint. These values are may only be the initial values of these thresholds and these values may be changed by the system programmer depending on the problem. That is for some problems where tolerances need to be very small, the "too large" field can be modified such that it is set to a few floating-points away from the midpoint while for problems where the uncertainty in the answer is fine, the thresholds can be revised upwards. Thus, knowledge of the underlying system (i.e. the fact that interval arithmetic is being used) is not necessary to use the system, but would significantly help optimize the problem. For example, in the above examples the system initially allocates enough memory locations for three floating-point numbers for representing floating-point data but does not use them yet. When this data is accessed, it may travel as a single floating-point from the main memory to a cache or to a register file, where, upon arrival, another floating-point number R denoting the radius will be added to the data, thereby converting the single floating-point to the MR representation. When the data makes its way up to the processing core's FPU another floating-point number may be added to the midpoint, thereby converting the MR representation to the (M+N, R) representation.

Figure 4:
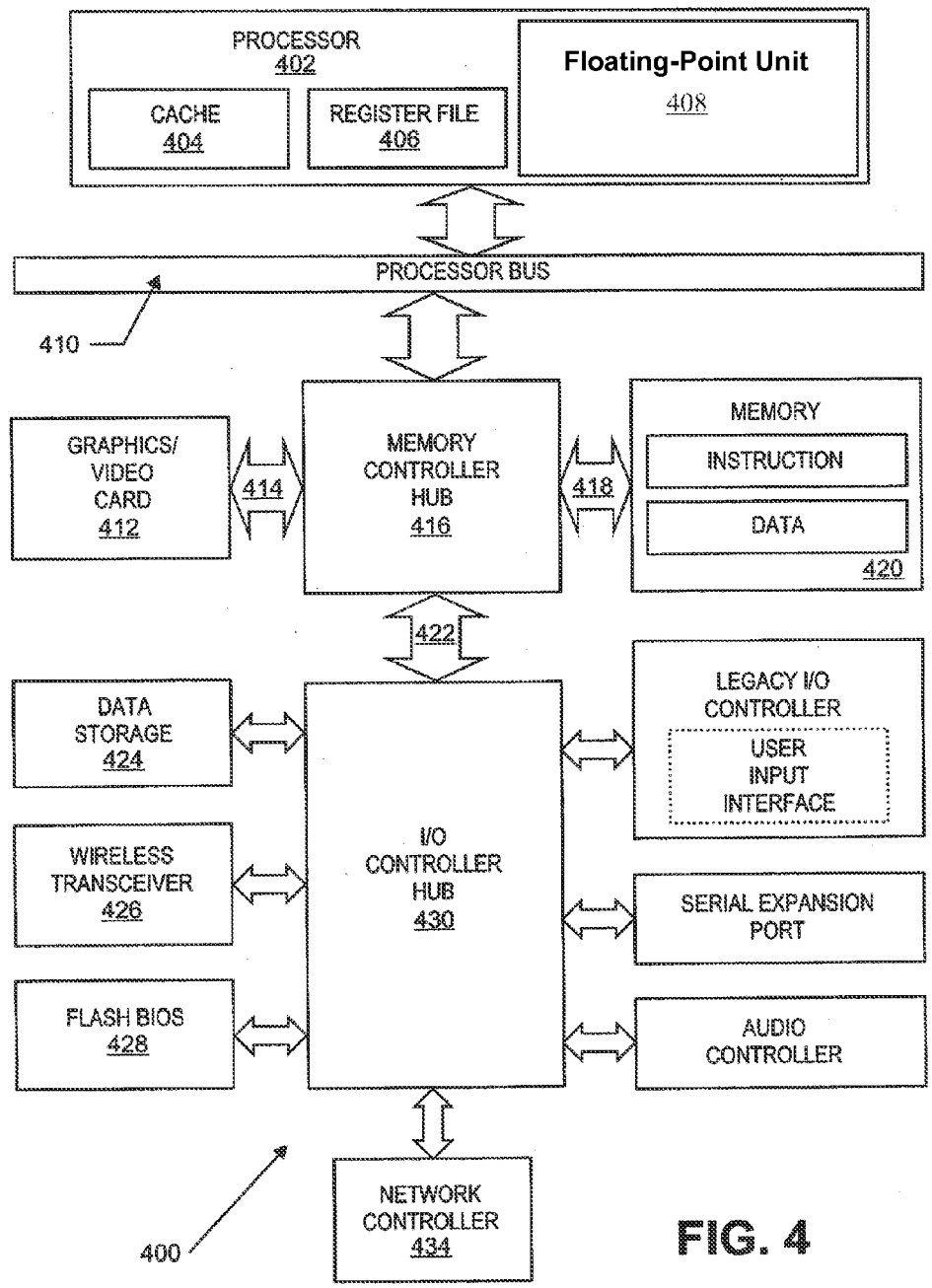
FIG. 4 is a block diagram of a system for representing numbers in a computer in accordance with an example embodiment of the present invention showing the flow of the represented data.

FIG. 4 is a block diagram of a computer system 400 formed with processor 402 that includes a floating-point unit 408 and a register file 406 for storing different types of data in various registers. One embodiment may be described in the context of a single processor desktop or server system, but alternative embodiments can be included in a multiprocessor system. System 400 is an example of a 'hub' system architecture. The computer system 400 includes a processor 402 to process data signals. The processor 402 is coupled to a processor bus 410 that can transmit data signals between the processor 402 and other components in the system 400. The elements of system 400 perform their conventional functions that are well known to those familiar with the art.

In one embodiment, the processor 402 includes a Level 1 (L1) internal cache memory 404. Depending on the architecture, the processor 402 can have a single internal cache or multiple levels of internal cache. Alternatively, in another embodiment, the cache memory can reside external to the processor 402. Other embodiments can also include a combination of both internal and external caches depending on the particular implementation and needs. Register file 406 can store different types of data in various registers including integer registers, floating-point registers, status registers, and instruction pointer register.

System 400 includes a memory 420. Memory 420 can be a dynamic random access memory (DRAM) device, a static random access memory (SRAM) device, flash memory device, or other memory device. Memory 420 can store instructions and/or data represented by data signals that can be executed by the processor 402.

A system logic chip 416 is coupled to the processor bus 410 and memory 420. The system logic chip 416 in the illustrated embodiment is a memory controller hub (MCH 416). The processor 402 can communicate to the MCH 416 via a processor bus 410. The MCH 416 provides a high bandwidth memory path 418 to memory 420 for instruction and data storage and for storage of graphics commands, data and textures. The MCH 416 is to direct data signals between the processor 402, memory 420, and other components in the system 400 and to bridge the data signals between processor bus 410, memory 420, and system I/O 422. In some embodiments, the system logic chip 416 can provide a graphics port for coupling to a graphics controller 412. The MCH 416 is coupled to memory 420 through a memory interface 418. The graphics card 412 is coupled to the MCH 416 through an Accelerated Graphics Port (AGP) interconnect 414.

In such a system 400, a floating-point number may be stored in the system memory at several levels, e.g. memory 420, cache memory 404, register file 406, etc. For example, a floating point number M may be stored in the main memory 420 as a single floating-point. When M is accessed, it may travel as a single floating-point from the main memory 420 to a cache 404 or to a register file 406, where, upon arrival, another floating-point number R denoting the radius will be added to the data, thereby converting the single floating-point to the dual floating-point MR representation. When M is used in a calculation the processor 402's FPU 408 may add another floating-point number to the midpoint, thereby converting the MR representation to the (M+N, R) representation. If the size of the interval generated by the (M+N, R) representation is significant after M is used in a calculation (e.g. N+R is greater than a first predefined threshold value) the floating-point number M is stored using the MR representation in the memory (e.g. cache 404 or memory 420), otherwise the radius is dropped and just the midpoint is written back to memory. If the size of the interval generated by the (M+N, R) representation is too large after M is used in a calculation (e.g. N+R is greater than a first predefined threshold value) the FPU 408 may inform the computer system that the floating-point number M may not be accurate.

System 400 uses a proprietary hub interface bus 422 to couple the MCH 416 to the I/O controller hub (ICH) 430. The ICH 430 provides direct connections to some I/O devices via a local I/O bus and may include a PCI Express root port 409. The local I/O bus is a high-speed I/O bus for connecting peripherals to the memory 420, chipset, and processor 402. Some examples are the audio controller, firmware hub (flash BIOS) 428, wireless transceiver 426, data storage 424, legacy I/O controller containing user input and keyboard interfaces, a serial expansion port such as Universal Serial Bus (USB), and a network controller 434. The data storage device 424 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A method for representing numbers in a memory of a computer system, the method comprising:
representing a floating-point number M in the memory;
accessing the floating-point number M and representing the floating-point number M as an interval with lower and upper bounds A and B by using at least two floating-point numbers in the memory upon accessing M; and
using the floating-point number M in a calculation and representing the floating-point number M as an interval with lower and upper bounds A and B by using at least three floating-point numbers in the memory upon using M in the calculation.

2. The method of claim 1, wherein:
representing the floating-point number M, when it is accessed, includes using a floating-point number R in which M is the midpoint of the interval and R is the radius so that A=M−R and B=M+R.

3. The method of claim 2, wherein:
representing the floating-point number M, if it is used in a calculation, includes using a floating-point number N in which M+N is the midpoint of the interval and R is the radius so that A=(M+N)−R and B=(M+N)+R.

4. The method of claim 3, wherein:
if (N>1FP) then M=M+1FP and N=N−1FP, and if (N<1FP) then M=M−1FP and N=N+1FP, wherein 1FP designates one floating point.

5. The method of claim 4, further comprising:
representing the floating-point number M as an interval with lower and upper bounds A and B after M is used in a calculation by using the floating-point number R in which M is the midpoint of the interval and R is the radius so that A=M−R and B=M+R only if N+R is greater than a first predefined threshold value.

6. The method of claim 5, further comprising:
informing the computer system that the floating-point number M may not be accurate if N+R is greater than a second predefined threshold value.

7. The method of claim 2, wherein:
representing the floating-point number M, when it is used in a calculation, includes using floating-point numbers N and P in which M+N is the midpoint of the interval and R+P is the radius so that A=(M+N)−(R+P) and B=(M+N)+(R+P).

8. The method of claim 7, wherein:
if (N>1FP) then M=M+1FP and N=N−1FP, and if (N<1FP) then M=M−1FP and N=N+1FP; and
if (P>1FP) then R=R+1FP and P=P−1FP, and if (P<1FP) then R=R−1FP and P=P+1FP, wherein 1FP designates one floating point.

9. The method of claim 8, further comprising:
representing the floating-point number M as an interval with lower and upper bounds A and B after M is used in a calculation by using the floating-point number R in which M is the midpoint of the interval and R is the radius so that A=M−R and B=M+R only if N+R+P is greater than a first predefined threshold value.

10. The method of claim 9, further comprising:
informing the computer system that the floating-point number M may not be accurate if N+R+P is greater than a second predefined threshold value.

11. The method of claim 2, wherein:
representing the floating-point number M, when it is used in a calculation, includes using floating-point numbers R1 and R2 in which M is the midpoint of the interval and R1 and R2 are the radii so that A=M−R1 and B=M+R2.

12. The method of claim 11, further comprising:
representing the floating-point number M as an interval with lower and upper bounds A and B after M is used in a calculation by using the floating-point number R in which M is the midpoint of the interval and R is the radius so that A=M−R and B=M+R only if (R1+R2)/2 is greater than a first predefined threshold value.

13. The method of claim 12, further comprising:
informing the computer system that the floating-point number M may not be accurate if (R1+R2)/2 is greater than a second predefined threshold value.

14. The method of claim 1, wherein:
representing the floating-point number M, when it is used in a calculation, includes using floating-point numbers a, b, p1 and p2 so that A=a+p1 and B=b−p2.

15. The method of claim 14, wherein:
representing the floating-point number M as an interval with lower and upper bounds A and B after M is used in a calculation by using the floating-point number R in which M is the midpoint of the interval and R is the radius so that A=M−R and B=M+R only if p1+p2 is greater than a first predefined threshold value.

16. The method of claim 15, further comprising:
informing the computer system that the floating-point number M may not be accurate if p1+p2 is greater than a second predefined threshold value.

17. A processor for representing numbers in a computer system, the processor comprising:
at least one floating-point unit; and
memory to store a floating-point number M;
wherein the processor is configured to:
access the floating-point number M and store the floating-point number M as an interval with lower and upper bounds A and B by using at least two floating-point numbers in the memory upon accessing M; and
use the floating-point number M in a calculation and store the floating-point number M as an interval with lower and upper bounds A and B by using at least three floating-point numbers in the memory upon using M in the calculation.

18. The processor of claim 17, further configured to:
store the floating-point number M by using a floating-point number R in which M is the midpoint of the interval and R is the radius so that A=M−R and B=M+R if M is accessed.

19. The processor of claim 18, further configured to:
store the floating-point number M by using a floating-point number N in which M+N is the midpoint of the interval and R is the radius so that A=(M+N)−R and B=(M+N)+R if M is used in a calculation.

20. The processor of claim 19, further configured to:
store the floating-point number M+N wherein:
if (N>1FP) then M=M+1FP and N=N−1FP, and
if (N<1FP) then M=M−1FP and N=N+1FP,
wherein 1FP designates one floating point.

21. The processor of claim 20, further configured to:
store the floating-point number M as an interval with lower and upper bounds A and B after M is used in a calculation by using the floating-point number R in which M is the midpoint of the interval and R is the radius so that A=M−R and B=M+R only if N+R is greater than a first predefined threshold value.

22. The processor of claim 21, further configured to:
inform the computer system that the floating-point number M may not be accurate if N+R is greater than a second predefined threshold value.

23. The processor of claim 18, further configured to:
store the floating-point number M includes using floating-point numbers N and P in which M+N is the midpoint of the interval and R+P is the radius so that A=(M+N)−(R+P) and B =(M+N)+(R+P) if M is used in a calculation.

24. The processor of claim 23, further configured to:
store the floating-point number M+N wherein:
if (N>1FP) then M=M+1FP and N=N−1FP, and
if (N<1FP) then M=M−1FP and N=N+1FP;
and store the floating-point number R+P wherein:
if (P>1FP) then R=R+1FP and P=P−1FP, and
if (P<1FP) then R=R−1FP and P=P+1FP,
wherein 1FP designates one floating point.

25. The processor of claim 18, further configured to:
store the floating-point number M by using floating-point numbers R1 and R2 in which M is the midpoint of the interval and R1 and R2 are the radii so that A=M−R1 and B=M+R2 if M is used in a calculation.

26. The processor of claim 17, further configured to:
store the floating-point number M, when it is used in a calculation, by using floating-point numbers a, b, p1 and p2 wherein A=a+p1 and B=b−p2.

27. A system for representing numbers in a computer, the system comprising:
memory for storing a floating-point number M;
at least one cache for storing M as an interval with lower and upper bounds A and B by using at least two floating-point numbers for accessing M; and
at least one processor including at least one floating-point unit for storing M as an interval with lower and upper bounds A and B by using at least three floating-point numbers for using M in a calculation.

28. The system of claim 27, wherein the at least one cache is configured to:
store the floating-point number M by using a floating-point number R in which M is the midpoint of the interval and R is the radius wherein A=M−R and B=M+R if M is accessed.

29. The system of claim 28, wherein the at least one processor is configured to:
store the floating-point number M by using a floating-point number N in which M+N is the midpoint of the interval and R is the radius so that A=(M+N)−R and B=(M+N)+R if M is used in a calculation.

30. The system of claim 29, wherein the at least one processor is configured to:
store the floating-point number M+N wherein:
if (N>1FP) then M=M+1FP and N=N−1FP, and
if (N<1FP) then M=M−1FP and N=N+1FP,
wherein 1FP designates one floating point.

31. The system of claim 30, wherein the at least one cache is configured to:
store the floating-point number M as an interval with lower and upper bounds A and B after M is used in a calculation by using the floating-point number R in which M is the midpoint of the interval and R is the radius so that A=M−R and B=M+R only if N+R is greater than a first predefined threshold value.

32. The system of claim 31, wherein the at least one processor is configured to:
inform the computer system that the floating-point number M may not be accurate if N+R is greater than a second predefined threshold value.

33. The system of claim 28, wherein the at least one processor is configured to:
store the floating-point number M by using floating-point numbers N and P in which M+N is the midpoint of the interval and R+P is the radius so that A=(M+N)−(R+P) and B=(M+N)+(R+P) if M is used in a calculation.

34. The system of claim 33, wherein the at least one processor is configured to:
store the floating-point number M+N wherein:
if (N>1FP) then M=M+1FP and N=N−1FP, and
if (N<1FP) then M=M−1FP and N=N+1FP;
and store the floating-point number R+P wherein:
if (P>1FP) then R=R+1FP and P=P−1FP, and
if (P<1FP) then R=R−1FP and P=P+1FP,
wherein 1FP designates one floating point.

35. The system of claim 28, wherein the at least one processor is configured to:
  store the floating-point number M by using floating-point numbers R1 and R2 in which M is the midpoint of the interval and R1 and R2 are the radii so that A=M−R1 and B=M+R2 if M is used in a calculation.

36. The system of claim 27, wherein the at least one processor is configured to:
  store the floating-point number M by using floating-point numbers a, b, p1 and p2 so that A=a+p1 and B=b−p2 if M is used in a calculation.

* * * * *